INVENTOR.
Willie W. Walden

Feb. 20, 1951     W. W. WALDEN     2,542,441
MACHINE FOR REMOVING PNEUMATIC TIRES FROM WHEEL RIMS
Filed Feb. 13, 1947     2 Sheets-Sheet 2
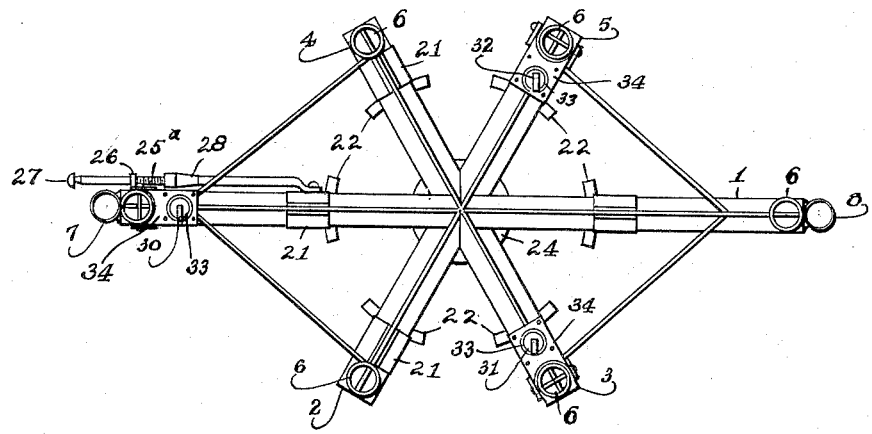
Fig. 3
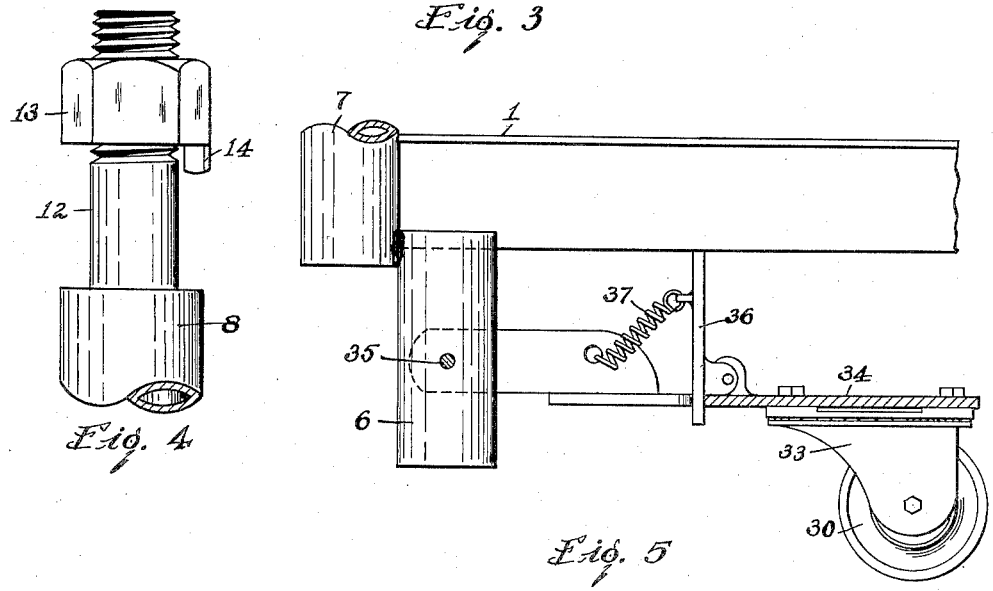
Fig. 4
Fig. 5
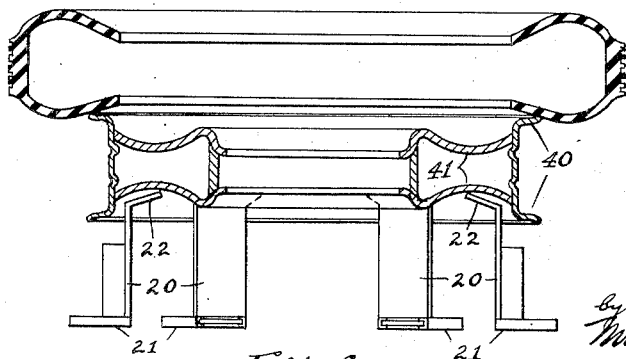
Fig. 6
INVENTOR.
Willie W. Walden

UNITED STATES PATENT OFFICE 2,542,441

MACHINE FOR REMOVING PNEUMATIC TIRES FROM WHEEL RIMS

Willie W. Walden, Hugo, Okla.

Application February 13, 1947, Serial No. 728,303

1 Claim. (Cl. 157—1.2)

The object of my present invention is to provide a socalled tire press, an instrumentality for removing pneumatic tires from the rims of automobile wheels comprising a movable framework carrying circumferentially adjustable tire supports and an overhead truss between which and the wheel a pressure exerting means, such as a jack, operates to depress the wheel.

Another object of my invention is to provide a tire press in which a series of vertical arms are radially adjustable to form a horizontal support for tires of different diameters within which the wheel is received as it is pressed out of the tire and which subsequently may be employed to grasp the wheel to firmly hold it while a tire is again being applied thereto.

Furthermore, my invention comprehends an apparatus of the above type which is mounted on casters that are readily rendered inoperative to allow the framework to rest upon a firm foundation and automatically restored to their operative position, thus adapting the machine to be moved from place to place in garages and tire repair shops.

To these and other ends my invention has for its object to provide further improvements in construction, all as will be fully described in the accompanying specification, the novel features thereof being set forth in the appended claim.

In the drawings:

Figure 3 is a bottom plan view.

Figure 4 is a detail of the cross bar lock.

Figure 5 is a fragmentary illustration partly in section, of a caster mounting.

Figure 6 is a sectional view of a wheel illustrating its support when applying a tire.

Similar reference characters in the several figures indicate similar parts.

Figure 1:
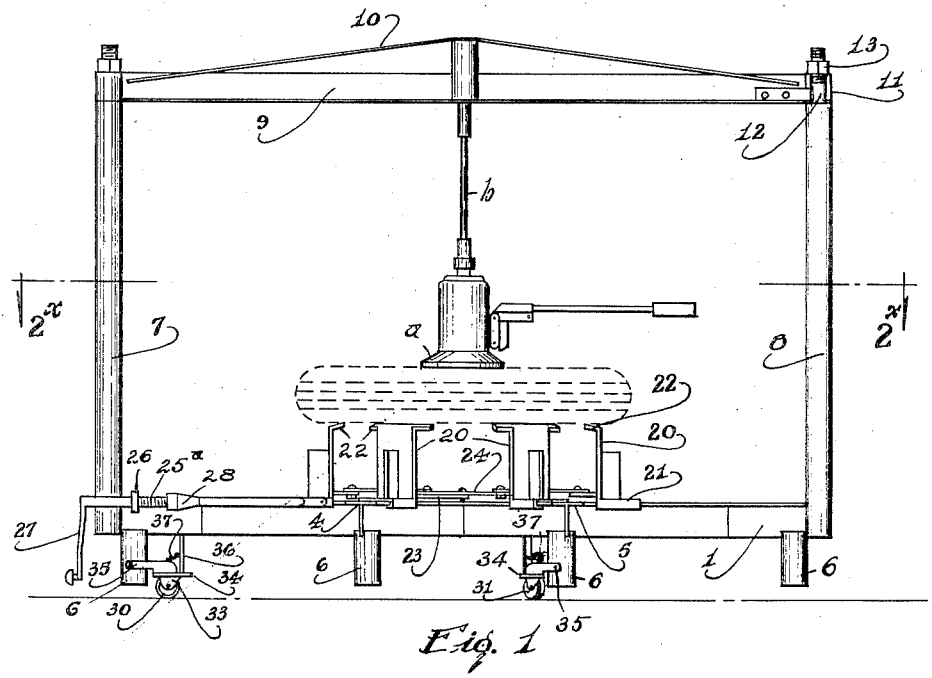
Figure 1 is a front elevation of a machine constructed in accordance with my invention.

In furtherance of my invention I provide a frame comprising a base formed of a transverse bar 1, T-shape in cross section, which has an overall length somewhat in excess of the diameter of the largest tire to be handled. Radiating from the mid-point of the bar are four arms 2, 3, 4 and 5 also T-shaped in cross section. Their combination with the bar 1 constitutes a spider which is supported in a horizontal plane on short legs 6 extending downwardly from the ends of bar 1 and the several arms attached thereto. The frame per se also comprises columns 7 and 8 extending vertically from the ends of bar 1 and a cross piece 9 located some distance above the base. This cross piece is strengthened to resist pressure at its center by a truss 10. It is also journaled on one of the columns to permit it to be swung laterally. At its free end the cross piece is provided with a jaw 11 which embraces a reduced portion at the top of the other arm which is in the form of a stud 12 having a threaded extremity carrying a nut 13.

A simple form of lock is thus effected and by providing the nut with a downwardly projecting pin or lip 14 a partial rotation of the nut is all that is required to throw the pin against the rear side of the jaw to lock the cross piece in operative position.

The spider carries adjustable elements which alternately provide a support for a tire when it is to be removed from a wheel and for the latter when a tire is to be applied to it. To this end each of the spider arms carries a pillar 20 comprising a base 21 having undercut guideways which embrace the edges of its respective spider arm and at its top carries an inwardly extending flange 22. The latter is curved on a circle struck from the center of the spider and is tipped slightly to position its inner edge upwardly to conform to the shape of a pneumatic tire adjacent the wheel rim.

The several pillars 20 are adjustable inwardly and outwardly simultaneously by connecting each of them by means of a link 23 to a turntable 24 journaled on a stud 25 projecting upwardly from the center of the spider frame. Any suitable means may be employed for rotating the turntable and in Figs. 1 and 2 I have shown for this purpose a screw 25a journaled in a bearing 26 mounted on the side of the bar 1 at one of its ends and operated by a hand crank 27. The inner end of the screw is threaded into the outer end of a tube 28, the other extremity of which is connected to the side of the adjacent pillar base 21. It will be seen, therefore, that by rotation of the screw 25a simultaneous adjustment of the several pillars may be accomplished.

To provide for the convenient transportation or movement of the apparatus in the workshop, I have provided a novel means of mounting it on casters 30, 31 and 32 which may be automatically adjusted in place and readily thrown into an inoperative position. In carrying out this feature of my invention I provide them as a three-point support, one being located on the leg 6 at one end of the base cross-piece 1, the others being connected to the legs on the more remotely located spider arms. Since these caster mountings are similar a description of one will suffice for all of them.

Each of the caster journals 33 are swiveled on the underside of an arm 34 having a bifurcated outer end embracing a leg 6 and pivoted thereto at a midpoint, as indicated by 35. When in the operative position to hold the leg 6 out of engagement with the floor, the arm 34 is approximately in a horizontal position and is so held by a strut or finger 36, the upper end of which engages the bottom edge of the corresponding spider arm. This finger is pivoted at its lower end to the arm 34 in rear of the opening or slot formed by its bifurcated end and has its lower extremity projecting into the slot which engages the base of the slot when it is in its vertical or operative position. The finger 36 being free to move in the opposite direction may be folded or collapsed over the inner end of the caster carrying arm when it is desired to have the machine firmly supported on the floor. In order to make these parts semiautomatic in their operation I provide a coil spring 37 which is placed under tension when the finger 36 is retracted. Thus it will be seen that by elevating the apparatus slightly, as by tipping it upwardly at one side, the action of the spring will move the finger 36 outwardly along the lower side of the spider arm to force the caster arm downwardly and as the spring holds the finger in this position the periphery of the caster roller is locked to hold the leg 6 elevated.

Figure 2:
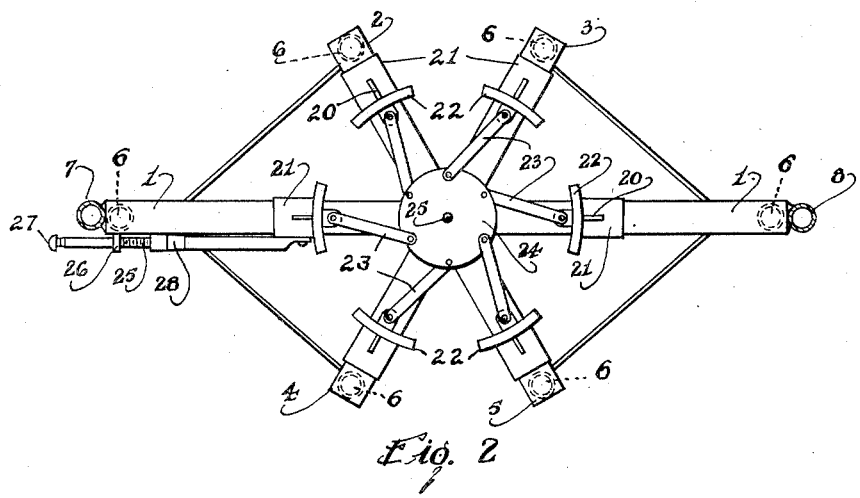
Figure 2 is a top plan view of the tire supports as seen looking downwardly from a plane indicated by the section line 2x—2x on Fig. 1.

In the operation of the above-described apparatus a vehicle wheel with the tire thereon first is laid in a horizontal position on the pillars as indicated by dotted lines in Fig. 1. By rotating crank 27 the several pillars 20 are advanced or retracted to form a broken ring support for the tire with their flanged ends 22 engaging the side walls of the tire adjacent the area entering the rim of the wheel. A jack which may be of any suitable construction, and operated either manually, hydraulically or by air pressure is brought into position over the center of the wheel with its base $a$ resting thereon and its expansible lifting column $b$ in contact with the underside of the cross-piece 9, the latter having been previously swung into closed position and locked by the nut 13. The desired pressure is then applied to the jack to "break" the tire loose from the metallic rim of the wheel. Occasionally it may be necessary to release the jack, turn the wheel and tire over and repeat the breaking operation. When the tire has been loosened the pressure of the jack holds both wheel and tire firmly while the operator proceeds to disengage the tire by distorting the edge of the carcass with a suitable tool or tools to slip its edge from beneath the rim of the wheel.

In Figure 6 I have shown the pillars 20 adjusted to engage within the wheel rim 40 below the spoke frame 41 to hold the wheel firmly (and in a convenient elevated position) while the then lower edge of a tire is forced into position within the rim as will be understood. This is usually accomplished by canting a tire somewhat and slipping a portion of one side of its inner periphery within the rim 40 and by successive blows expanding it sufficiently to slip its circumference into place. While the parts are in this position the inner tube may be inserted in the carcass. At this point the pillars may be retracted, the wheel lifted and inverted when the pillar flanges again come into play to support the tire while the other inner edge of the carcass is forced into position within the opposite flanged edge of the wheel rim, much in the manner already described.

I claim:

A portable machine for use in connection with a jack for handling pneumatic tires and wheel rims comprising a rectangular frame composed of a lower horizontal beam supported adjacent the floor, uprights at the ends of the beam and an upper cross arm forming a jack abutment spaced above the beam, said arm being swingable on one of the supports and having an interlocking connection with the other support, other horizontal arms radiating from the center of the beam, pillars guided on the upper surface of the beam and said horizontal arms for supporting a wheel and its tire, a turn-table journaled on the beam and links connecting it to the pillars and means for rotating the turn-table comprising a pitman guided on one of the ends of said beam and connected to one of said pillars and a manually operated crank member also supported on the frame having a screw connected to the pitman.

WILLIE W. WALDEN.

REFERENCES CITED

The following references are of record in the file of this patent:

UNITED STATES PATENTS

| Number | Name | Date |
|---|---|---|
| 569,033 | Schrader | Oct. 6, 1896 |
| 601,088 | Verel | Mar. 22, 1898 |
| 1,009,388 | Doll | Nov. 21, 1911 |
| 1,058,837 | Zikmund | Apr. 15, 1913 |
| 1,724,813 | Weaver et al. | Aug. 13, 1929 |
| 1,983,608 | Hand | Dec. 11, 1934 |
| 2,043,169 | Hawkinson | June 2, 1936 |
| 2,375,956 | Smith et al. | May 15, 1945 |
| 2,387,839 | Frost | Oct. 30, 1945 |

FOREIGN PATENTS

| Number | Country | Date |
|---|---|---|
| 492,552 | Germany | Feb. 25, 1930 |